United States Patent [19]
Sugahara et al.

[11] Patent Number: 5,847,335
[45] Date of Patent: Dec. 8, 1998

[54] ROTATIVELY-OPERATED ELECTRONIC COMPONENT WITH PUSH SWITCH AND ROTARY ENCODER

[75] Inventors: Jun Sugahara, Kume-gun; Koji Ono; Takumi Nishimoto, both of Tsuyama, all of Japan

[73] Assignee: Matsushita Electric Industrial Co., Ltd., Osaka, Japan

[21] Appl. No.: 897,700

[22] Filed: Jul. 21, 1997

[30] Foreign Application Priority Data

Aug. 23, 1996 [JP] Japan ................................ 8-222118

[51] Int. Cl.⁶ ............................ H01H 9/00; H01H 13/52; H01H 25/06; H01C 1/00
[52] U.S. Cl. .................... 200/4; 260/11 R; 260/11 DA; 260/11 G; 260/18
[58] Field of Search ................................. 200/4, 5 R, 6 A, 200/11 R, 11 G, 11 J, 11 D, 11 DA, 11 K, 11 TW, 18, 5 E, 338; 361/308; 338/172, 200; 345/156

[56] References Cited

U.S. PATENT DOCUMENTS

| | | | |
|---|---|---|---|
| 4,000,382 | 12/1976 | Kolb | 200/4 |
| 4,363,018 | 12/1982 | Matsui et al. | 338/172 |
| 4,510,355 | 4/1985 | Atsumi et al. | 200/338 X |
| 4,724,286 | 2/1988 | Cummins | 200/4 |
| 4,866,219 | 9/1989 | Riding et al. | 200/4 |
| 5,180,050 | 1/1993 | Rada et al. | 200/4 X |
| 5,337,210 | 8/1994 | Ishikawa et al. | 361/308 |
| 5,436,413 | 7/1995 | Katakami | 200/14 |
| 5,459,292 | 10/1995 | Nagano et al. | 200/4 X |
| 5,510,810 | 4/1996 | Nishijima et al. | 345/156 |
| 5,581,058 | 12/1996 | Javery et al. | 200/4 |
| 5,588,524 | 12/1996 | Wu | 200/5 E X |
| 5,705,778 | 1/1998 | Matsui | 200/18 X |

Primary Examiner—J. R. Scott
Attorney, Agent, or Firm—Pollock, Vande Sande & Amernick

[57] ABSTRACT

A bushing has a hole being of a circular cross section and extending through walls of the bushing. The hole in the bushing has an upper portion forming a small-diameter portion and a lower portion forming a large-diameter portion. An operation shaft extends through the hole in the bushing. The operation shaft has an upper portion forming a small-diameter portion and a lower portion forming a large-diameter portion. The operation shaft is rotatable circumferentially relative to the bushing, and is movable axially relative to the bushing. The small-diameter portion of the operation shaft extends upward from the small-diameter portion of the hole in the bushing, and the large-diameter portion of the operation shaft is greater in diameter than the small-diameter portion of the hole in the bushing. A rotary component portion includes a rotatable member. The rotatable member is coupled to a lower portion of the operation shaft. The rotatable member is allowed to rotate together with the operation shaft and to be stationary independent of axial movement of the operation shaft. A first contact is fixed to a lower surface of the rotatable member. A second contact is resilient, and is provided on a fixed base plate. The second contact relatively slides on the first contact as the rotatable member rotates. A push switch portion is located below the rotary component portion, and engages a lower end of the operation shaft. The push switch portion operates when being pressed by the lower end of the operation shaft in accordance with axial movement of the operation shaft.

4 Claims, 8 Drawing Sheets

ROTATIVELY-OPERATED ELECTRONIC COMPONENT WITH PUSH SWITCH AND ROTARY ENCODER

BACKGROUND OF THE INVENTION

1. Field of the Invention

This invention relates to a composite device or a rotatively-operated electronic component with a push switch which is usable in various electric equipments such as audio equipments or video equipments. This invention also relates to a method of manufacturing a composite device or a rotatively-operated electronic component with a push switch.

2. Description of the Related Art

U.S. Pat. No. 5,180,050 discloses a pushbutton rotary switch in which a switch actuator mounted in a housing for axial and rotary movement operates a rotary switch on the actuator axis through an axial lost motion connection. A pushbutton switch offset from the axis is engaged by a semi-circular plate radially extending from the actuator and is actuated upon axial movement of the actuator for any rotary position of the actuator. Optionally, the plate has apertures which register with the pushbutton switch at selected actuator rotary positions to disable pushbutton operation at the selected positions. The actuator is made of light conducting transparent plastic to illuminate an indicator on the switch knob from a bulb within the housing. A flexible detent finger integrally moulded into the housing engages the plate during its axial movement to impart tactile feel.

In the pushbutton rotary switch of U.S. Pat. No. 5,180,050, a pushbutton switch portion and a rotary switch portion can be operated by a common knob. The knob is mounted on an end of a stem connected to both the control button of the pushbutton switch portion and the control shaft of the rotary switch portion. The stem has a step, and a larger-diameter portion and a smaller-diameter portion extending in opposite sides of the step respectively. The smaller-diameter portion of the stem extends into a housing through a hole in walls of the housing. The larger-diameter-portion of the stem is located in the housing. The hole in the walls of the housing is smaller in cross-sectional area than the larger-diameter portion of the stem. When the stem assumes a normal position, the step of the stem abuts against the walls of the housing.

SUMMARY OF THE INVENTION

It is a first object of this invention to provide an improved composite device or an improved rotatively-operated electronic component with a push switch.

It is a second object of this invention to provide an improved method of manufacturing a composite device or a rotatively-operated electronic component with a push switch.

A first aspect of this invention provides a rotatively-operated electronic component with a push switch, comprising a bushing which has a hole being of a circular cross section and extending through walls of the bushing, wherein the hole in the bushing has an upper portion forming a small-diameter portion and a lower portion forming a large-diameter portion; an operation shaft extending through the hole in the bushing, the operation shaft having an upper portion forming a small-diameter portion and a lower portion forming a large-diameter portion, the operation shaft being rotatable circumferentially relative to the bushing and being movable axially relative to the bushing, wherein the small-diameter portion of the operation shaft extends upward from the small-diameter portion of the hole in the bushing, and the large-diameter portion of the operation shaft is greater in diameter than the small-diameter portion of the hole in the bushing; a rotary component portion including a rotatable member; means for coupling the rotatable member to a lower portion of the operation shaft, and allowing the rotatable member to rotate together with the operation shaft and to be stationary independent of axial movement of the operation shaft; a fixed base plate; a first contact fixed to a lower surface of the rotatable member; and a second contact being resilient and being provided on the fixed base plate, the second contact being located below the first contact and being in touch with the first contact, the second contact relatively sliding on the first contact as the rotatable member rotates; and a push switch portion located below the rotary component portion and engaging a lower end of the operation shaft, the push switch portion operating when being pressed by the lower end of the operation shaft in accordance with axial movement of the operation shaft.

A second aspect of this invention is based on the first aspect thereof, and provides a rotatively-operated electronic component with a push switch wherein the bushing has a step at a boundary between the small-diameter portion and the large-diameter portion of the hole in the bushing, and the operation shaft has a step at a boundary between the small-diameter portion and the large-diameter portion thereof, and wherein the step of the bushing and the step of the operation shaft are in contact with each other when the operation shaft is in its normal position.

A third aspect of this invention is based on the first aspect thereof, and provides a rotatively-operated electronic component with a push switch wherein the operation shaft has downwardly-extending pins at positions symmetrical with respect to a center of the operation shaft, the downwardly-extending pins fitting into recesses in the rotatable member.

A fourth aspect of this invention provides a method of manufacturing a rotatively-operated electronic component with a push switch, comprising the steps of previously combining parts of a push switch portion and a fixed base plate of a rotary component portion into a switch block; using an inverted U-shaped binding member as a reference while sequentially stacking a bushing, an operation shaft, a rotatable member, and the switch block from below with respect to the inverted U-shaped binding member; and bending edges of legs of the inverted U-shaped binding member into engagement with a lower surface of the switch block to combine the bushing, the operation shaft, the rotatable member, and the switch block together.

A fifth aspect of this invention provides a composite device comprising a common shaft being rotatable circumferentially and being movable axially; a rotatively-operated electronic component including a rotary member and being operated in response to rotation of the rotary member; a key coupling for connecting the rotary member in the rotatively-operated electronic component with the common shaft, and allowing the rotary member to rotate in response to rotation of the common shaft and to be stationary independent of axial movement of the common shaft; a push switch including an axially movable member and being operated in response to axial movement of the axially movable member; and means for connecting the axially movable member with the common shaft and allowing the axially movable member to move axially in response to axial movement of the common shaft; wherein the key coupling includes an axially-extending pin provided on one of the common shaft and the rotary member in the rotatively-operated electronic component, the axially-extending pin fitting into a recess in the other of the common shaft and the rotary member, the axially-extending pin being at a position separate from a center of rotation of the common shaft.

DESCRIPTION OF THE PREFERRED EMBODIMENT

A prior-art composite device will be explained hereinafter for a better understanding of this invention.

Figure 1:
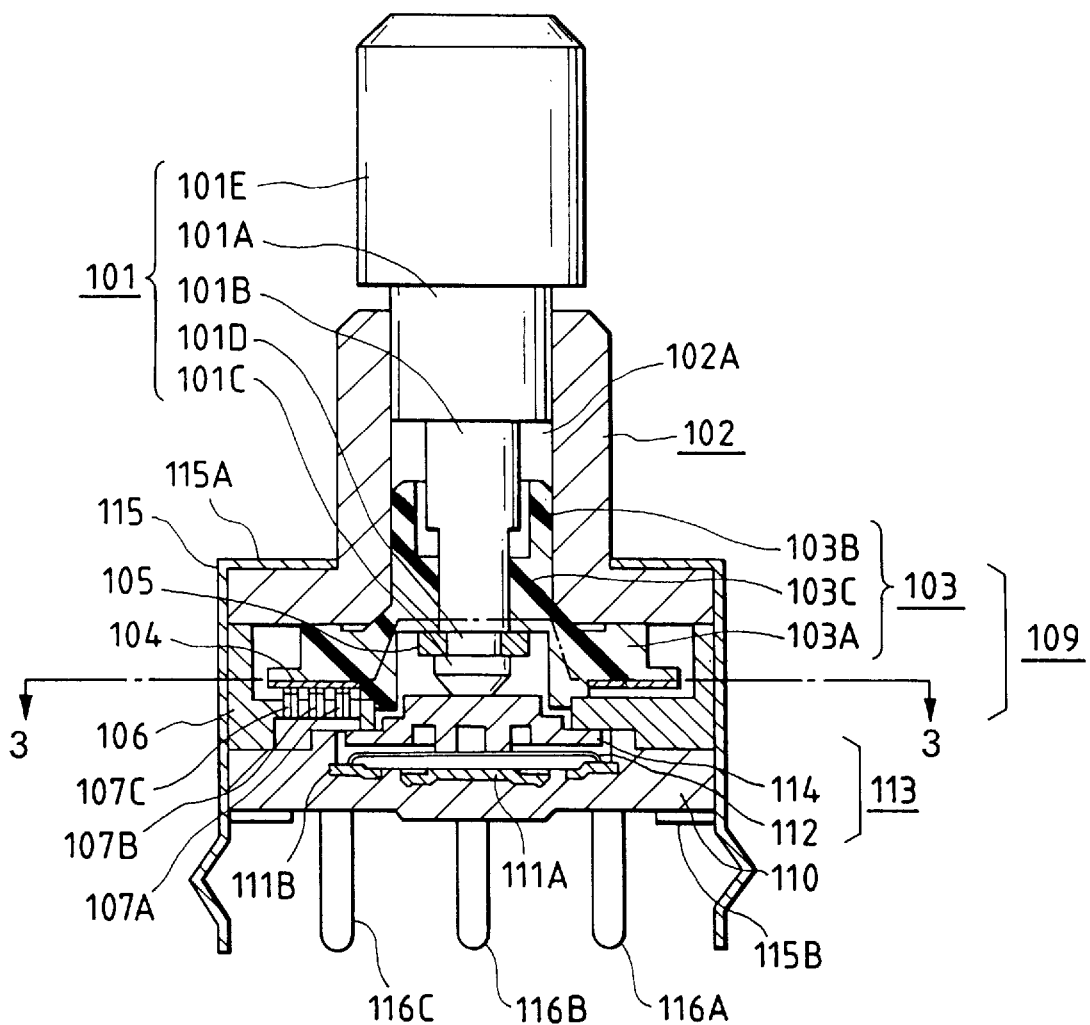
FIG. 1 is a sectional view of a background-art composite device.

FIG. 1 shows a prior-art composite device which includes an operation shaft 101 made of metal. The operation shaft 101 extends through a cylindrical hole 102A in a bushing 102 which forms an upper portion of a device housing. The operation shaft 101 can rotate circumferentially relative to the walls of the bushing 102. The operation shaft 101 can move upward and downward relative to the walls of the bushing 102. In other words, the operation shaft 101 can move in the axial direction relative to the walls of the bushing 102.

An upper end 101E of the operation shaft 101 forms a large-diameter portion which can be used as a knob. The knob 101E is located outside the device housing. The operation shaft 101 has an intermediate-diameter cylindrical portion 101A which extends downward from the upper end (the large-diameter portion) 101E. There is a step at the boundary between the intermediate-diameter cylindrical portion 101A and the upper end (the large-diameter portion) 101E. The intermediate-diameter cylindrical portion 101A of the operation shaft 101 extends and fits into the cylindrical hole 102A in the bushing 102 via an upper end of the hole 102A.

A rotary member 103 made of molded resin extends in the device housing. The rotary member 103 has a disk portion 103A and a cylindrical portion 103B. The outside diameter of the disk portion 103A is greater than the outside diameter of the cylindrical portion 103B. The cylindrical portion 103B extends coaxially and upward from the disk portion 103A. The cylindrical portion 103B of the rotary member 103 extends and fits into the cylindrical hole 102A in the bushing 102 via a lower end of the hole 102A. The rotary member 103 can rotate circumferentially relative to the walls of the bushing 102. A contact plate 104 is fixed to a lower surface of the disk portion 103A of the rotary member 103. The contact plate 104 can rotate together with the rotary member 103.

The cylindrical portion 103B of the rotary member 103 has a stepped hole 103C axially extending through the walls of the cylindrical portion 103B. An upper portion of the stepped hole 103C is greater in cross section than a lower portion thereof. There is a step at the boundary between the upper portion and the lower portion of the stepped hole 103C. The lower portion of the stepped hole 103C has a non-circular cross section.

The operation shaft 101 has a small-size stepped portion 101B extending downward from the intermediate-diameter cylindrical portion 101A. There is a step at the boundary between the intermediate-diameter cylindrical portion 101A and the small-size stepped portion 101B. The small-size stepped shaft portion 101B extends into the stepped hole 103C in the cylindrical portion 103B of the rotary member 103. An upper region of the small-size stepped shaft portion 101B is greater in cross section than a lower region thereof. There is a step at the boundary between the upper region and the lower region of the small-size stepped shaft portion 101B. The lower region of the small-size stepped shaft portion 101B has a non-circular cross section. The lower region of the small-size stepped shaft portion 101B is similar in shape to the lower portion of the stepped hole 103C in the cylindrical portion 103B of the rotary member 103. The lower region of the small-size stepped shaft portion 101B is slightly smaller in cross section than the lower portion of the stepped hole 103C. The lower region of the small-size stepped shaft portion 101B extends through the lower portion of the stepped hole 103C. Thereby, the lower region of the small-size stepped shaft portion 101B engages the part of the rotary member 103 which defines the lower portion of the stepped hole 103C. Since the cross section of the lower region of the small-size stepped shaft portion 101B and the cross section of the lower portion of the stepped hole 103C are non-circular, the rotary member 103 can rotate circumferentially together with the operation shaft 101. The lower region of the small-size stepped shaft portion 101B can move axially relative to the cylindrical portion 103B of the rotary member 103. Accordingly, the operation shaft 101 can move axially relative to the rotary member 103.

Figure 2:
FIG. 2 is a perspective view of a C-shaped washer in FIG. 1.

The lower surface of the disk portion 103A of the rotary member 103 has a central recess which communicates with the stepped hole 103C in the cylindrical portion 103B of the rotary member 103. A lower portion of the operation shaft 101 extends into the central recess in the disk portion 103A of the rotary member 103 from the stepped hole 103C in the cylindrical portion 103B of the rotary member 103. The lower portion of the operation shaft 101 in the central recess of the disk portion 103A of the rotary member 103 has an circumferentially-extending groove 101D into which a washer or snap 105 fits. As shown in FIG. 2, the washer 105 has a shape of the letter "C". When the operation shaft 101 assumes its uppermost position (its normal position), the C-shaped washer 105 abuts against the walls of the rotary member 103 which define the bottom of the central recess in the disk portion 103A of the rotary member 103. Accordingly, the C-shaped washer 105 prevents the separation of the operation shaft 101 from the rotary member 103.

A lower end of the bushing 102 forms an outwardly-extending flange with which a fixed base plate 106 contacts.

The fixed base plate 106 is located below the bushing 102. The rotary member 103 is rotatably supported between the flange of the bushing 102 and an inward projection of the fixed base plate 106.

Figure 3:
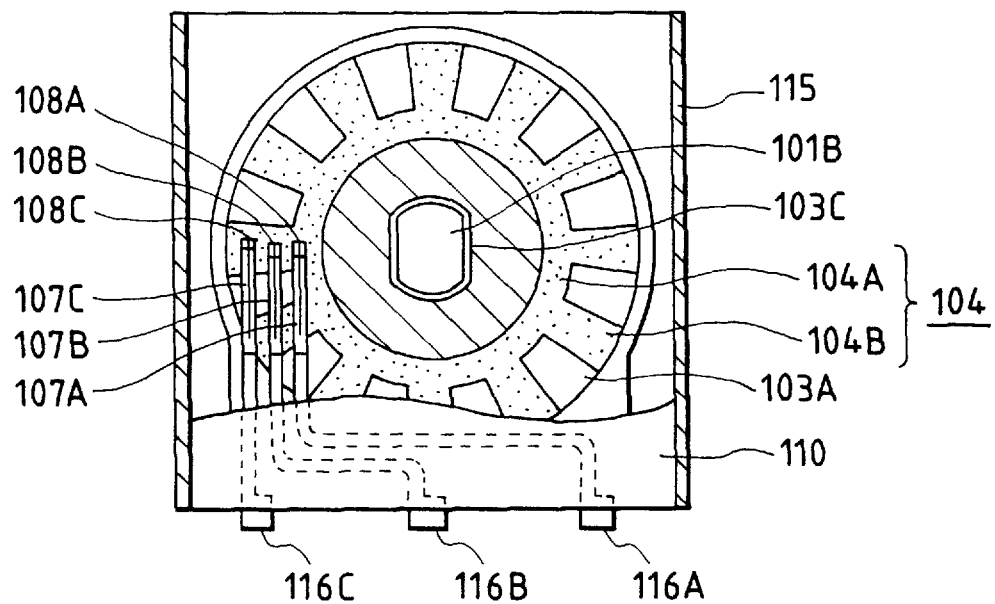
FIG. 3 is a sectional view taken along the line 3—3 of FIG. 1.

As shown in FIG. 3, the contact plate 104 has an inner ring contact 104A and linear contacts 104B. The linear contacts 104B extend radially outward from the inner ring contact 104A. Accordingly, the inner ring contact 104A and the linear contacts 104B are electrically connected to each other. The linear contacts 104B are spaced along a circumferential direction at equal angular intervals. The walls of the disk portion 103A of the rotary member 103 are exposed at the spaces between the linear contacts 104B. As previously explained, the rotary member 103 is made of molded resin. Accordingly, the linear contacts 104B are separated from each other by insulating zones.

As shown in FIG. 1, the contact plate 104 axially separates from walls of the fixed base plate 106 by a given interval. Three resilient contact arms 107A, 107B, and 107C extend from the fixed base plate 106. As shown in FIG. 3, the resilient contact arms 107A, 107B, and 107C have tips 108A, 108B, and 108C respectively. The tip 108A of the resilient contact arm 107A is pressed against the inner ring contact 104A of the contact plate 104 by the elasticity of the resilient contact arm 107A. During rotation of the contact plate 104, that is, during rotation of the operation shaft 101, the tip 108A of the resilient contact arm 107A remains in touch with the inner ring contact 104A of the contact plate 104. The tip 108B of the resilient contact arm 107B is pressed against one of the linear contacts 104B of the contact plate 104 or the walls of the disk portion 103A of the rotary member 103 by the elasticity of the resilient contact arm 107B. During rotation of the contact plate 104, that is, during rotation of the operation shaft 101, the tip 108B of the resilient contact arm 107B sequentially and alternately meets the linear contacts 104B of the contact plate 104 and the walls of the disk portion 103A of the rotary member 103 so that a first electric pulse signal can be generated between the resilient contact arms 107A and 107B. The tip 108C of the resilient contact arm 107C is pressed against one of the linear contacts 104B of the contact plate 104 or the walls of the disk portion 103A of the rotary member 103 by the elasticity of the resilient contact arm 107C.

During rotation of the contact plate 104, that is, during rotation of the operation shaft 101, the tip 108C of the resilient contact arm 107C sequentially and alternately meets the linear contacts 104B of the contact plate 104 and the walls of the disk portion 103A of the rotary member 103 so that a second electric pulse signal can be generated between the resilient contact arms 107A and 107C. The position of the tip 108B of the resilient contact arm 107B is offset from the position of the tip 108C of the resilient contact arm 107C in the circumferential direction with respect to the contact plate 104. Accordingly, the phase of the first electric pulse signal differs from the phase of the second electric pulse signal.

The rotary member 103, the contact plate 104, and the resilient contact arms 107A, 107B, and 107C constitute parts of a rotary encoder 109.

A switch base plate 110 extends below the fixed base plate 106. The switch base plate 110 abuts against the fixed base plate 106. A central fixed contact 111A and an outer fixed contact 11B are provided on an upper surface of the switch base plate 110. The center of the central fixed contact 111A is on an extension of the axis of the operation shaft 101. Lower edges of a dome-shaped movable contact 112 are placed on the outer fixed contact 111B. Thus, the dome-shaped movable contact 112 is electrically connected to the outer fixed contact 111B. The dome-shaped movable contact 112 is made of a resilient metal plate. As will be explained later, the dome-shaped movable contact 112 can move into and out of touch with the central fixed contact 111A. The central fixed contact 111A, the outer fixed contact 111B, and the dome-shaped movable contact 112 constitute parts of a push switch 113. An intermediate plate 114 is seated between the dome-shaped movable contact 112 and a lower end 101C of the operation shaft 101. The intermediate plate 114 can move axially together with the operation shaft 101. The dome-shaped movable contact 112 is deformed in accordance with axial movement of the intermediate plate 114, that is, axial movement of the operation shaft 101.

When the operation shaft 101 is in its uppermost position (its normal position), the dome-shaped movable contact 112 separates from the central fixed contact 111A. In this case, the central fixed contact 111A remains electrically disconnected from the outer fixed contact 111B. As the operation shaft 101 is axially moved from its uppermost position (its normal position) to its lowermost position, the dome-shaped movable contact 112 is deformed and brought into touch with the central fixed contact 111A while remaining in touch with the outer fixed contact 111B. In this case, the central fixed contact 111A is electrically connected to the outer fixed contact 111B via the dome-shaped movable contact 112. Accordingly, an on/off signal or a binary signal can be generated between the central fixed contact 111A and the outer fixed contact 111B in response to axial movement of the operation shaft 101.

The switch base plate 110 supports terminals 116A, 116B, and 116C which are electrically connected to the resilient contact arms 107A, 107B, and 107C respectively. The switch base plate 110 also supports terminals (not shown) which are electrically connected to the central fixed contact 111A and the outer fixed contact 111B respectively.

A binding member 115 has an approximately inverted U shape. An upper end of the binding member 115 has an inwardly-extending flange 115A in contact with upper surfaces of the outwardly-extending flange of the bushing 102. A lower portion of the binding member 115 has inwardly-extending flanges 115B pressed against lower surfaces of the switch base plate 110. The outwardly-extending flange of the bushing 102, the fixed base plate 106, and the switch base plate 110 are bound together between the upper flange 115A and the lower flanges 115B of the binding member 115. The binding member 115 and the switch base plate 110 form a lower portion of the device housing. The outwardly-extending flange of the bushing 102, the fixed base plate 106, and the switch base plate 110 extend in a region between legs of the binding member 115.

As the operation shaft 101 is rotated by actuating the knob 101E, the rotary member 103 and the contact plate 104 are rotated. Accordingly, the tips 108A, 108B, and 108C of the resilient contact arms 107A, 107B, and 107C slide relative to the inner ring contact 104A and the linear contacts 104B of the contact plate 104. Thus, the first and second pulse signals are generated, being transmitted from the resilient contact arms 107A, 107B, and 107C to the terminals 116A, 116B, and 116C. Generally, the dome-shaped movable contact 112 remains separate from the central fixed contact 111A independent of rotation of the operation shaft 101. Accordingly, the push switch 113 remains inactive during rotation of the operation shaft 101.

Figure 4:
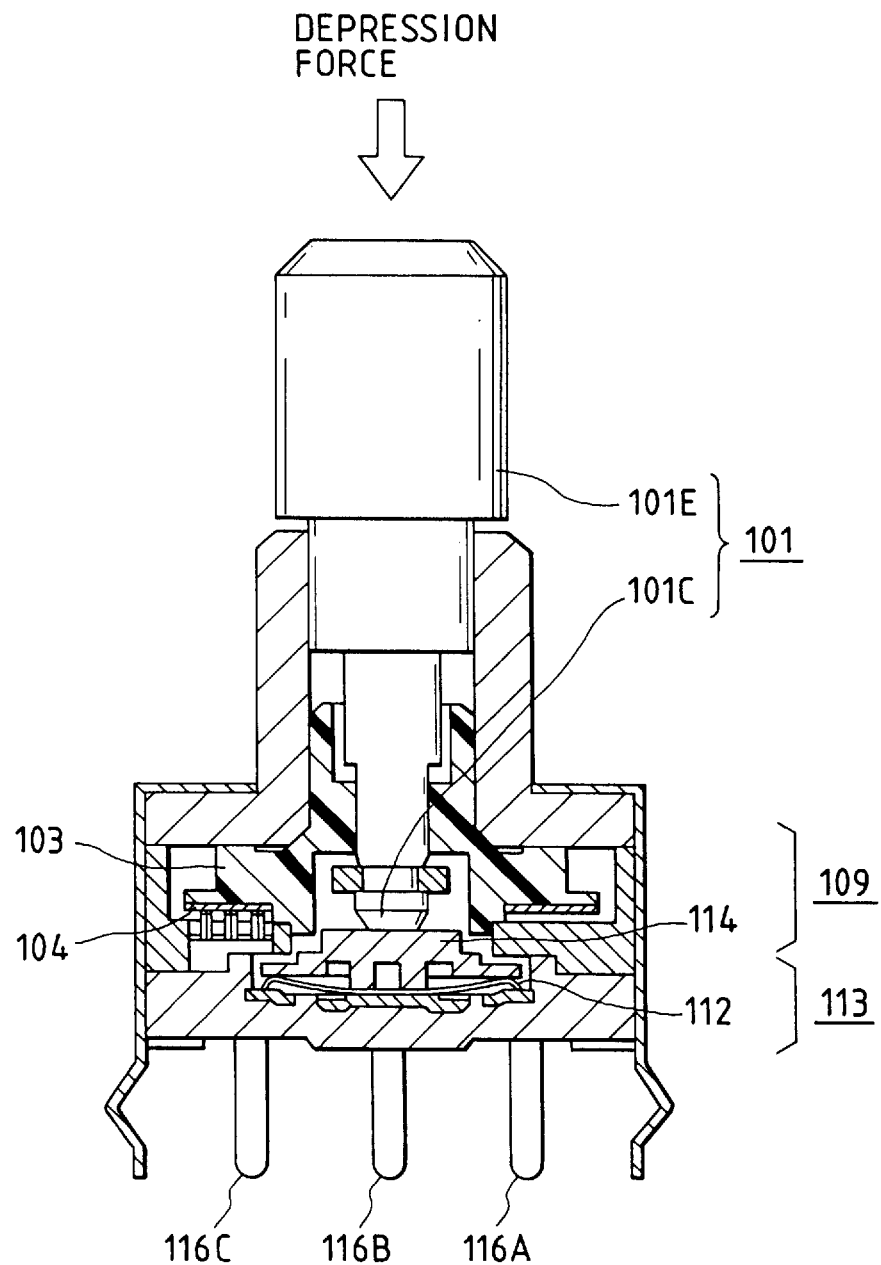
FIG. 4 is a sectional view of the background-art composite device which is in a position where a knob is depressed.

As shown in FIG. 4, when the operation shaft 101 is axially depressed by actuating the knob 110E, the lower end 110C of the operation shaft 101 presses the dome-shaped movable contact 112 downward via the intermediate plate 114. Therefore, the dome-shaped movable contact 112 is deformed and brought into touch with the central fixed contact 111A while remaining in touch with the outer fixed contact 111B. In this way, the push switch 113 is changed from an off state to an on state upon axial depression of the operation shaft 101. The rotary member 103 remains stationary independent of axial movement of the operation shaft 101.

Accordingly, the rotary encoder 109 remains inactive during axial depression of the operation shaft 101.

In the prior-art composite device of FIGS. 1–4, it tends to be laborious to place the C-shaped washer 105 into the groove 101D in the operation shaft 101. To allow axial movement of the operation shaft 101 relative to the rotary member 103, there is provided a given clearance between the lower region of the small-size stepped portion 101B of the operation shaft 101 and the portion of the rotary member 103 which defines the lower portion of the stepped hole 103C. This clearance provides a play angle in rotation of the operation shaft 101 to actuate the rotary encoder 109. Such a play angle is conspicuous when rotation of the operation shaft 101 is reversed.

Figure 5:
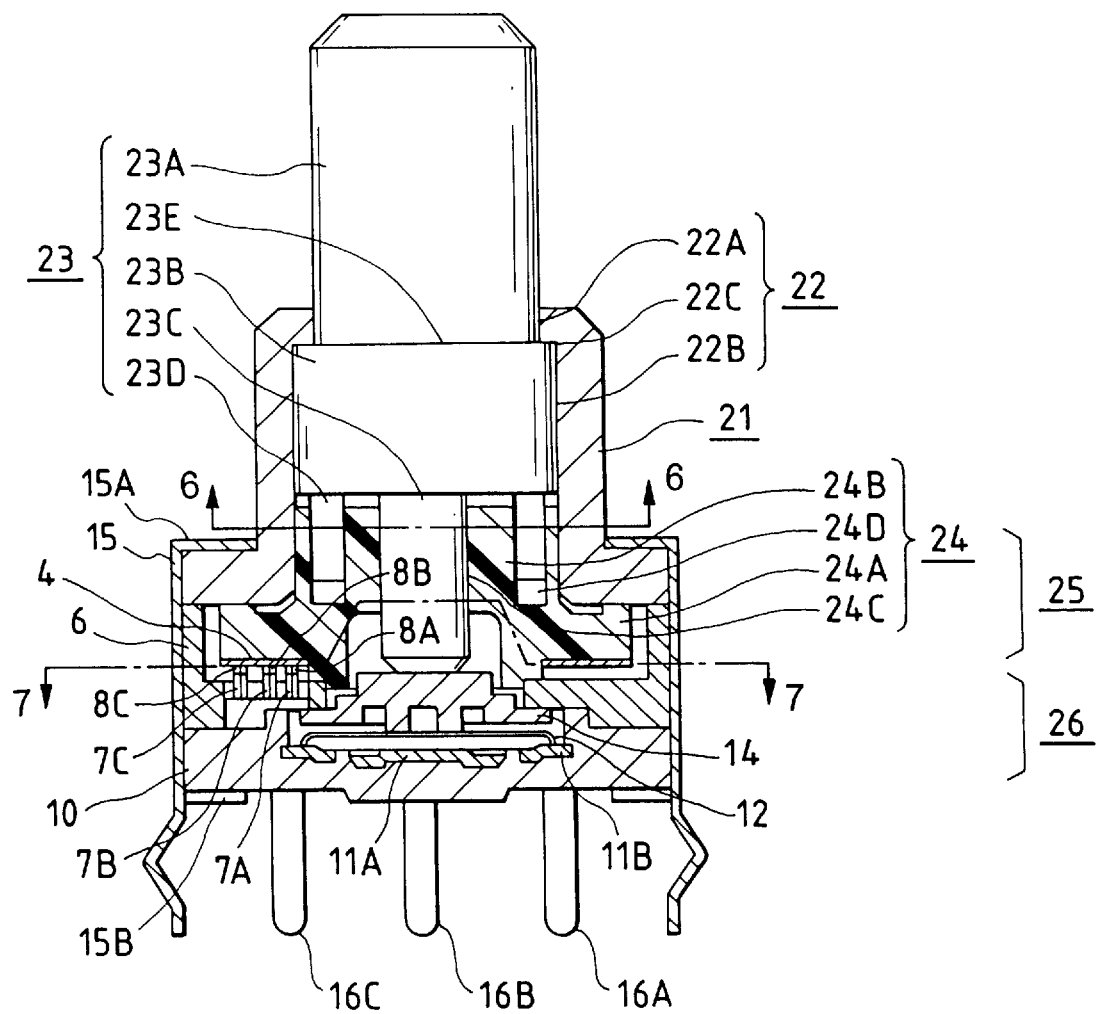
FIG. 5 is a sectional view of a rotatively-operated electronic component with a push switch according to an embodiment of this invention.

FIG. 5 shows a composite device or a rotatively-operated electronic component with a push switch according to an embodiment of this invention. The composite device of FIG. 5 includes a bushing 21 made of, for example, a metal die casting. The bushing 21 forms an upper portion of a device housing. The bushing 21 has an approximately cylindrical hole 22 extending through the walls thereof. An upper end of the bushing 21 has an inwardly-extending flange. A lower end of the bushing 21 has an outwardly-extending flange. The cylindrical hole 22 in the bushing 21 has a small-diameter portion 22A and a large-diameter portion 22B. The small-diameter portion 22A occupies an upper end of the cylindrical hole 22. The large-diameter portion 22B extends below the small-diameter portion 22A. There is a step 22C at the boundary between the small-diameter portion 22A and the large-diameter portion 22B of the cylindrical hole 22.

An approximately cylindrical operation shaft 23 coaxially extends through the cylindrical hole 22 in the bushing 21. The operation shaft 23 is made of, for example, metal. The operation shaft 23 can rotate circumferentially relative to the walls of the bushing 21. The operation shaft 23 can move upward and downward relative to the walls of the bushing 21. In other words, the operation shaft 23 can move in the axial direction relative to the walls of the bushing 21.

An upper portion 23A of the operation shaft 23 forms a small-diameter portion which can be used as a knob. The small-diameter portion 23A of the operation shaft 23 upwardly extends out of the bushing 21. An intermediate portion 23B of the operation shaft 23 forms a large-diameter portion extending below the small-diameter portion 23A. There is a step 23E at the boundary between the small-diameter portion 23A and the large-diameter portion 23B of the operation shaft 23. The diameter of the intermediate potion 23B of the operation shaft 23 is greater than the diameter of the small-diameter portion 22A of the cylindrical hole 22 in the bushing 21. The large-diameter portion 23B of the operation shaft 23 slidably fits in the large-diameter portion 22B of the cylindrical hole 22 in the bushing 21. A lower portion 23C of the operation shaft 23 forms a small-diameter portion extending below the large-diameter portion 23B. There is a step at the boundary between the large-diameter portion 23B and the small-diameter portion 23C.

The small-diameter portion 23C of the operation shaft 23 downwardly extends out of the cylindrical hole 22 in the bushing 21.

A rotary member 24 made of molded resin extends in the device housing. The rotary member 24 has a disk portion 24A and a cylindrical portion 24B. The outside diameter of the disk portion 24A is greater than the outside diameter of the cylindrical portion 24B. The cylindrical portion 24B extends coaxially and upward from the disk portion 24A. The cylindrical portion 24B of the rotary member 24 extends and fits into the cylindrical hole 22 in the bushing 21 via a lower end of the hole 22. The rotary member 24 can rotate circumferentially relative to the walls of the bushing 21. A contact plate 4 is fixed to a lower surface of the disk portion 24A of the rotary member 24. The combination of the contact plate 4 and the rotary member 24 is formed by a suitable process such as a molding process using an insert. The contact plate 4 can rotate together with the rotary member 24.

The cylindrical portion 24B of the rotary member 24 has an axially-extending central hole 24C of a circular cross section. The small-diameter portion 23C of the operation shaft 23 slidably extends through the central hole 24C in the cylindrical portion 24B of the rotary member 24. Specifically, the small-diameter portion 23C of the operation shaft 23 can move axially relative to the walls of the cylindrical portion 24B of the rotary member 24. In other words, the small-diameter portion 23C of the operation shaft 23 can move upward and downward relative to the walls of the cylindrical portion 24B of the rotary member 24.

Figure 6:
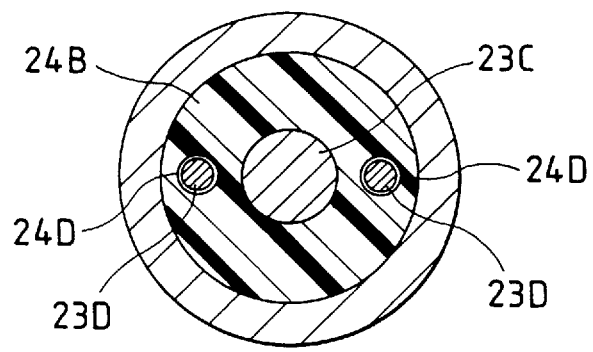
FIG. 6 is a sectional view taken along the line 6—6 of FIG. 5.

As shown in FIGS. 5 and 6, the operation shaft 23 has off-center pins 23D extending downward from lower surfaces of the large-diameter portion 23B which define the step between the large-diameter portion 23B and the small-diameter portion 23C.

The off-center pins 23D extend axially with respect to the operation shaft 23. The off-center pins 23D extend radially outward of the small-diameter portion 23C of the operation shaft 23. Each of the off-center pins 23D has a circular cross section. The positions of the off-center pins 23D are symmetrical with respect to the center of the operation shaft 23.

As shown in FIGS. 5 and 6, the cylindrical portion 24B of the rotary member 24 has off-center recesses 24D extending from upper surface thereof. Each of the off-center recesses 24D has a circular cross section. The positions of the off-center recesses 24D are symmetrical with respect to the center of the rotary member 24. The off-center recesses 24D extend radially outward of the central hole 24C in the cylindrical portion 24B of the rotary member 24. The off-center pins 23D of the operation shaft 23 slidably fit into the off-center recesses 24D in the cylindrical portion 24B of the rotary member 24, respectively. The off-center pins 23D of the operation shaft 23 can move axially relative to the walls of the rotary member 24. In other words, the off-center pins 23D of the operation shaft 23 can move upward and downward relative to the walls of the rotary member 24.

The off-center pins 23D of the operation shaft 23 which extend into the off-center recesses 24D in the rotary member 24 form a key coupling or a key engagement between the operation shaft 23 and the rotary member 24. Since the pins 23D and the recesses 24D are of off-set configurations, the key engagement (the key coupling) allows the rotary member 24 to rotate together with the operation shaft 23. In addition, the key engagement (the key coupling) allows the operation shaft 23 to move axially relative to the rotary member 24.

The lower surface of the disk portion 24A of the rotary member 24 has a central recess which communicates with the central hole 24C in the cylindrical portion 24B of the rotary member 24. The small-diameter portion 23C of the operation shaft 23 extends into the central recess in the disk portion 24A of the rotary member 24 from the central hole 24C in the cylindrical portion 24B of the rotary member 24.

As previously explained, the lower end of the bushing 21 has an outwardly-extending flange. A fixed base plate 6 contacts with the outwardly-extending flange of the bushing 21. The fixed base plate 106 is located below the bushing 21. The rotary member 24 is rotatably supported between the outwardly-extending flange of the bushing 21 and an inward projection of the fixed base plate 6.

Figure 7:
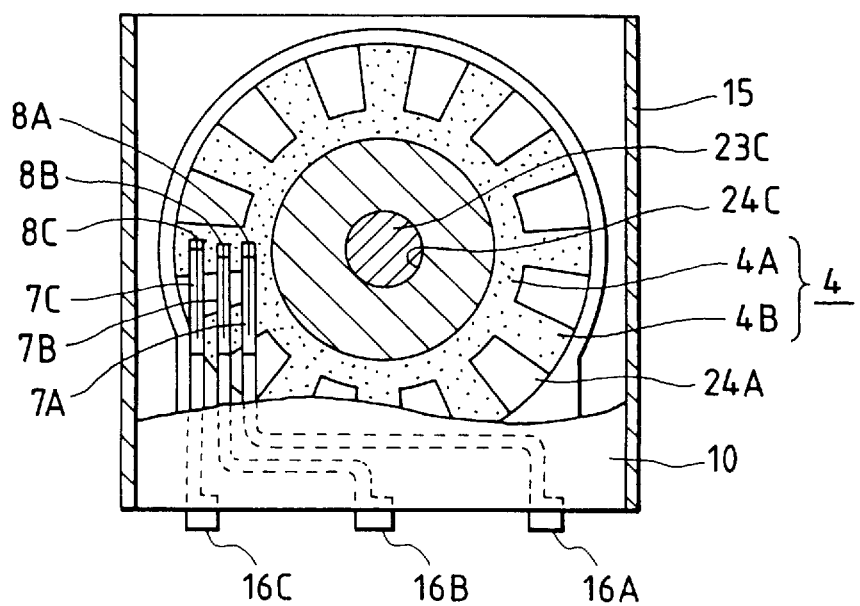
FIG. 7 is a sectional view taken along the line 7—7 of FIG. 5.

As shown in FIG. 7, the contact plate 4 has an inner ring contact 4A and linear contacts 4B. The linear contacts 4B extend radially outward from the inner ring contact 4A. Accordingly, the inner ring contact 4A and the linear contacts 4B are electrically connected to each other. The linear contacts 4B are spaced along a circumferential direction at equal angular intervals. The walls of the disk portion 24A of the rotary member 24 are exposed at the spaces between the linear contacts 4B. As previously explained, the rotary member 24 is made of molded resin. Accordingly, the linear contacts 4B are separated from each other by insulating zones.

As shown in FIG. 5, the contact plate 4 axially separates from walls of the fixed base plate 6 by a given interval. Three resilient contact arms 7A, 7B, and 7C extend from the fixed base plate 6. As shown in FIG. 7, the resilient contact arms 7A, 7B, and 7C have tips 8A, 8B, and 8C respectively. The tip 8A of the resilient contact arm 7A is pressed against the inner ring contact 4A of the contact plate 4 by the elasticity of the resilient contact arm 7A. During rotation of the contact plate 4, that is, during rotation of the operation shaft 23, the tip 8A of the resilient contact arm 7A remains in touch with the inner ring contact 4A of the contact plate 4. The tip 8B of the resilient contact arm 7B is pressed against one of the linear contacts 4B of the contact plate 4 or the walls of the disk portion 24A of the rotary member 24 by the elasticity of the resilient contact arm 7B. During rotation of the contact plate 4, that is, during rotation of the operation shaft 23, the tip 8B of the resilient contact arm 7B sequentially and alternately meets the linear contacts 4B of the contact plate 4 and the walls of the disk portion 24 of the rotary member 24 so that a first electric pulse signal can 20 be generated between the resilient contact arms 7A and 7B. The tip 8C of the resilient contact arm 7C is pressed against one of the linear contacts 4B of the contact plate 4 or the walls of the disk portion 24A of the rotary member 24 by the elasticity of the resilient contact arm 7C. During rotation of the contact plate 4, that is, during rotation of the operation shaft 23, the tip 8C of the resilient contact arm 7C sequentially and alternately meets the linear contacts 4B of the contact plate 4 and the walls of the disk portion 24A of the rotary member 24 so that a second electric pulse signal can be generated between the resilient contact arms 7A and 7C. The position of the tip 8B of the resilient contact arm 7B is offset from the position of the tip 8C of the resilient contact arm 7C in the circumferential direction with respect to the contact plate 4.

Accordingly, the phase of the first electric pulse signal differs from the phase of the second electric pulse signal.

The rotary member 24, the contact plate 4, and the resilient contact arms 7A, 7B, and 7C constitute parts of a rotary encoder 25.

A switch base plate 10 extends below the fixed base plate 6.

The switch base plate 10 abuts against the fixed base plate 6. A central fixed contact 11A and an outer fixed contact 11B are fixed to an upper surface of the switch base plate 10. The combination of the central fixed contact 11A, the outer fixed contact 11B, and the switch base plate 10 is formed by a suitable process such as a molding process using inserts. The center of the central fixed contact 11A is on an extension of the axis of the operation shaft 23. Lower edges of a dome-shaped movable contact 12 are placed on the outer fixed contact 11B. Thus, the dome-shaped movable contact 12 is electrically connected to the outer fixed contact 11B. The dome-shaped movable contact 12 is made of a resilient metal plate. As will be explained later, the dome-shaped movable contact 12 can move into and out of touch with the central fixed contact 11A. The central fixed contact 11A, the outer fixed contact 11B, and the dome-shaped movable contact 12 constitute parts of a push switch 26. An intermediate plate 14 is seated between the dome-shaped movable contact 12 and a lower end of the operation shaft 23. The intermediate plate 14 can move axially together with the operation shaft 23. The dome-shaped movable contact 12 is deformed in accordance with axial movement of the intermediate plate 14, that is, axial movement of the operation shaft 23.

When the operation shaft 23 is in its uppermost position (its normal position), the dome-shaped movable contact 12 separates from the central fixed contact 11A. In this case, the central fixed contact 11A remains electrically disconnected from the outer fixed contact 11B. As the operation shaft 23 is axially moved from its uppermost position (its normal position) to its lowermost position, the dome-shaped movable contact 12 is deformed and brought into contact with the central fixed contact 11A while remaining in touch with the outer fixed contact 11B. In this case, the central fixed contact 11A is electrically connected to the outer fixed contact 11B via the dome-shaped movable contact 12. Accordingly, an on/off signal or a binary signal can be generated between the central fixed contact 11A and the outer fixed contact 11B in response to axial movement of the operation shaft 23.

The switch base plate 10 supports terminals 16A, 16B, and 16C which are electrically connected to the resilient contact arms 7A, 7B, and 7C respectively. The switch base plate 10 also supports terminals (not shown) which are electrically connected to the central fixed contact 11A and the outer fixed contact 11B respectively.

A binding member 15 has an approximately inverted U shape. An upper end of the binding member 15 has an inwardly-extending flange 15A in contact with upper surfaces of the outwardly-extending flange of the bushing 21. A lower portion of the binding member 15 has inwardly-extending flanges 15B pressed against lower surfaces of the switch base plate 10. The outwardly-extending flange of the bushing 21, the fixed base plate 6, and the switch base plate 10 are bound together between the upper flange 15A and the lower flanges 15B of the binding member 15. The binding member 15 and the switch base plate 10 form a lower portion of the device housing. The outwardly-extending flange of the bushing 21, the fixed base plate 6, and the switch base plate 10 extend in a region between legs of the binding member 15.

The dome-shaped movable contact 12 urges the operation shaft 23 upward via the intermediate plate 14. In the absence of a depression force, the operation shaft 23 is held by the force of the dome-shaped movable contact 12 at its uppermost position (its normal position). When the operation shaft 23 is in its uppermost position (its normal position), the step 23E between the small-diameter portion 23A and the large-diameter portion 23B of the operation shaft 23 is pressed against inner surfaces of the bushing 21 which define the step 22C between the small-diameter portion 22A and the large-diameter portion 22B of the cylindrical hole 22. This engagement between the operation shaft 23 and the bushing 21 prevents the separation of the operation shaft 23 from the bushing 21.

As the operation shaft 23 is rotated by actuating the small-diameter portion 23A thereof, the rotary member 24 and the contact plate 4 are rotated. Accordingly, the tips 8A, 8B, and 8C of the resilient contact arms 7A, 7B, and 7C slide relative to the inner ring contact 4A and the linear contacts 4B of the contact plate 4. Thus, the first and second pulse signals are generated, being transmitted from the resilient contact arms 7A, 7B, and 7C to the terminals 16A, 16B, and 16C. Generally, the dome-shaped movable contact 12 remains separate from the central fixed contact 11A independent of rotation of the operation shaft 23. Accordingly, the push switch 26 remains inactive during rotation of the operation shaft 23.

Figure 8:
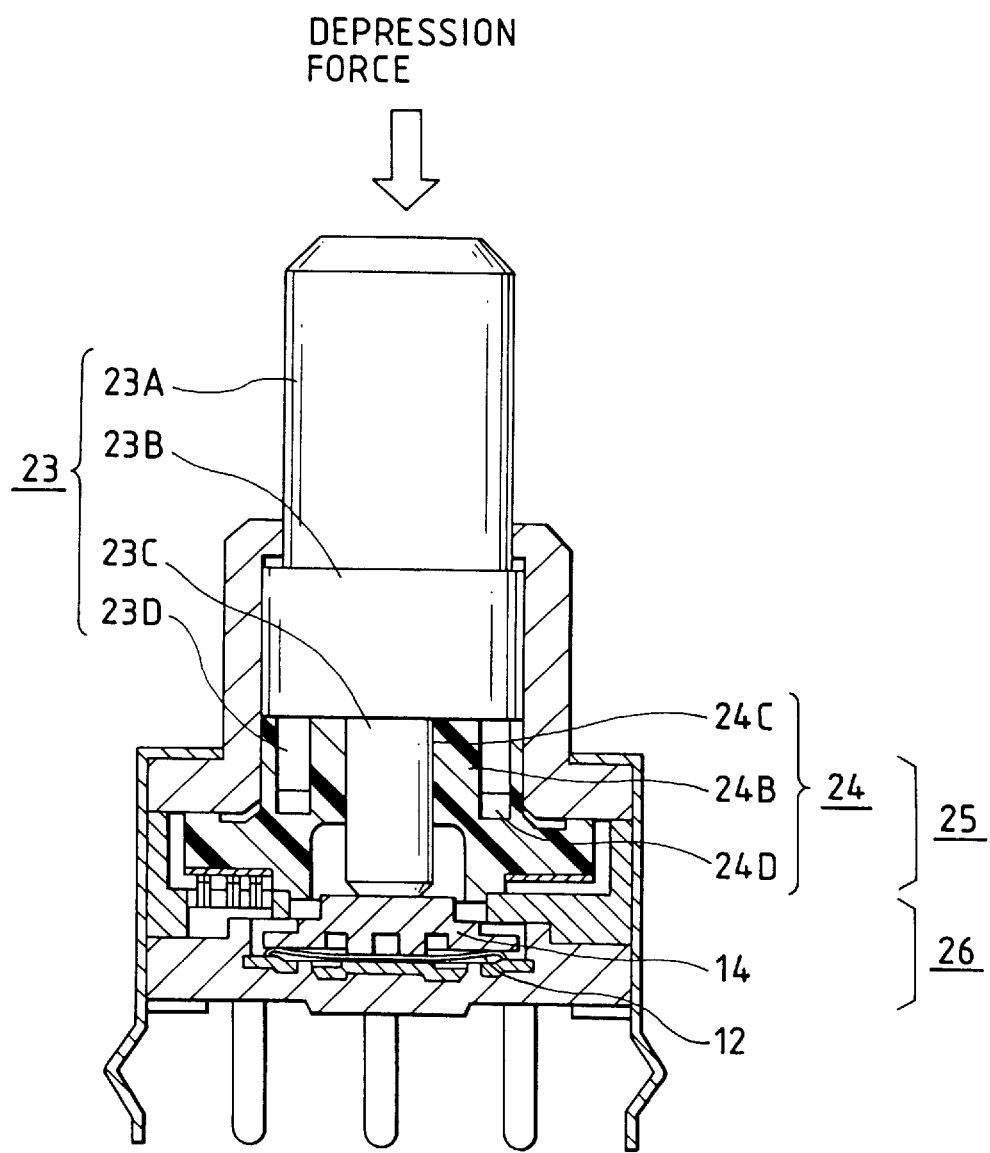
FIG. 8 is a sectional view of the rotatively-operated electronic component with the push switch according to the embodiment of this invention which is in a position where an operation shaft is depressed.

As shown in FIG. 8, when the operation shaft 23 is axially depressed by actuating the upper end thereof, the lower end of the operation shaft 23 presses the dome-shaped movable contact 12 downward via the intermediate plate 14. Therefore, the dome-shaped movable contact 12 is deformed and brought into touch with the central fixed contact 11A while remaining in touch with the outer fixed contact 11B. In this way, the push switch 26 is changed from an off state to an on state upon axial depression of the operation shaft 23. The rotary member 24 remains stationary independent of axial movement of the operation shaft 23. Accordingly, the rotary encoder 25 remains inactive during axial depression of the operation shaft 23.

In the key coupling between the operation shaft 23 and the rotary member 24, the positions of the off-center pins 23D are sufficiently distant from the position of the axis of the operation shaft 23, that is, the position of the center of rotation of the operation shaft 23. Similarly, the positions of the off-center recesses 24D are sufficiently distant from the position of the axis of the rotary member 24, that is, the position of the center of rotation of the rotary member 24. Accordingly, there can be only a small play angle in rotation of the operation shaft 23 to actuate the rotary encoder 25.

Figure 9:
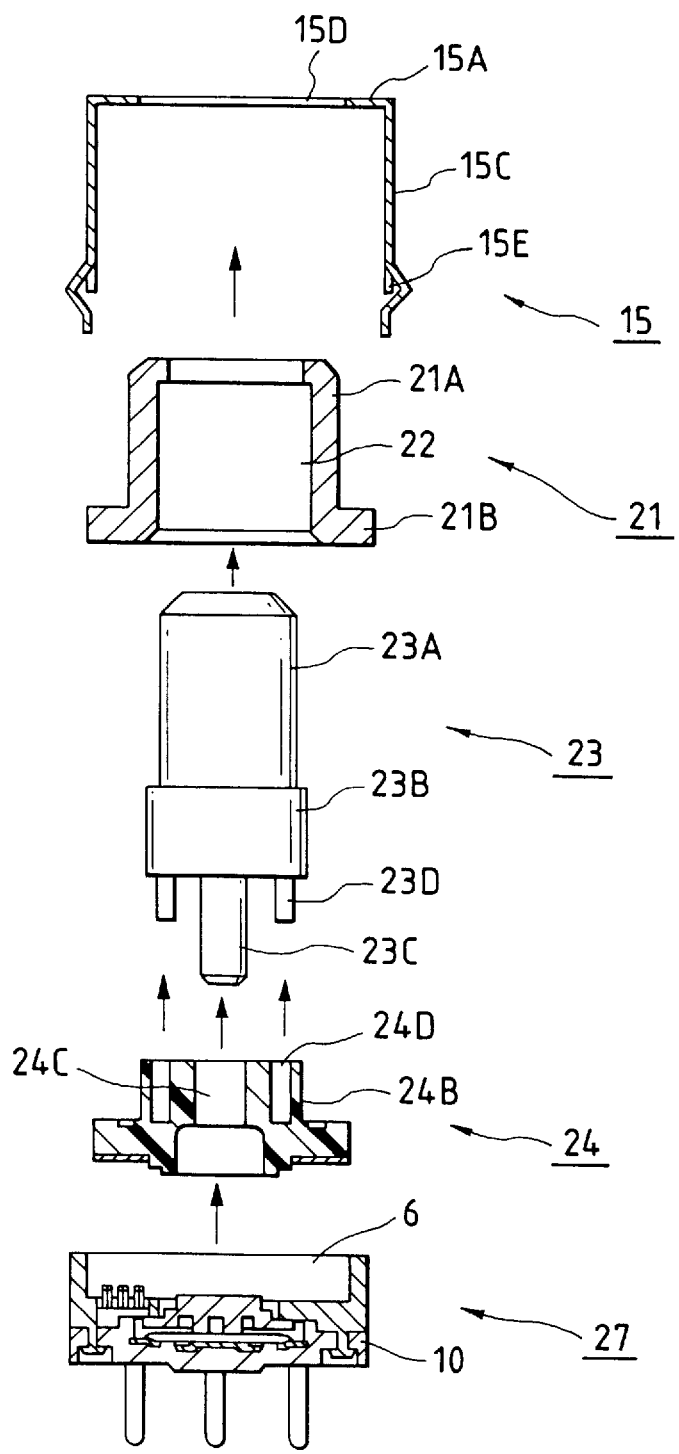
FIG. 9 is an exploded sectional view of parts of the rotatively-operated electronic component with the push switch according to the embodiment of this invention.

The composite device of FIGS. 5–8 is assembled and manufactured as follows. With reference to FIG. 9, a binding member 15 is prepared. An upper end of the binding member 15 has an inwardly-extending flange 15A and a central opening 15D. The binding member 15 has legs 15C opposing each other. A bushing 21 is prepared. The bushing 21 has a cylindrical portion 21A, and a flange 21B extending outward from a lower end of the cylindrical portion 21A. The bushing 21 is placed into a region between the legs 15C of the binding member 15 from below. The cylindrical portion 21A of the bushing 21 is passed through the central opening 15D of the binding member 15. The outwardly-extending flange 21B of the bushing 21 is brought into contact with the inwardly-extending flange 15A of the binding member 15.

Subsequently, an operation shaft 23 is placed into the cylindrical hole 22 in the bushing 21 from below. A small-diameter portion 23A of the operation shaft 23 is passed through an opening at an upper end of the bushing 21 while a large-diameter portion 23B of the operation shaft 23 is moved into the cylindrical hole 22 in the bushing 21. Then, a rotary member 24 is placed onto a lower portion of the operation shaft 23 from below. During this step, a small-diameter portion of the operation shaft 23 is passed through a central hole 24C in a cylindrical portion 24B of the rotary member 24 while off-center pins 23D of the operation shaft 23 are inserted into off-center recesses 24D in the cylindrical portion 24B of the rotary member 24.

Subsequently, a switch block 27 including a fixed base plate 6 and a switch base plate 10 is placed into a region between the legs 15C of the binding member 15 from below. Then, lower edges 15E of the legs 15C of the binding member 15 are bent inward to press lower surfaces of the switch base plate 10 upward. As a result, the composite device of FIGS. 5–8 is completed.

Figure 10:
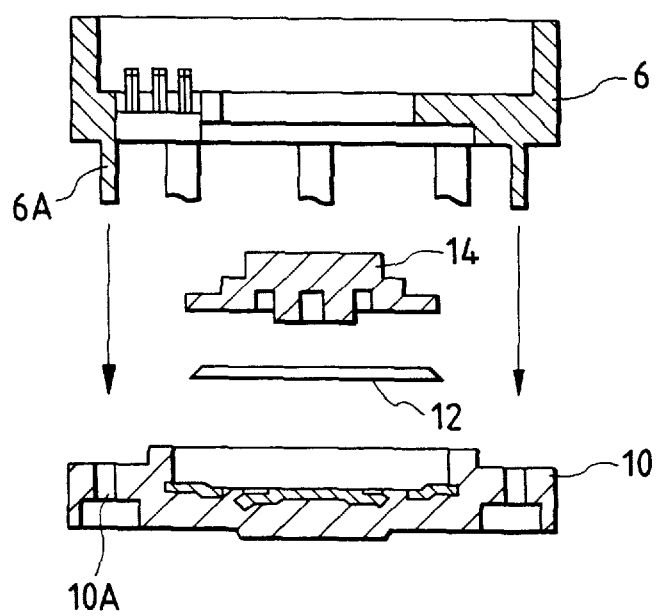
FIG. 10 is an exploded sectional view of a switch block in FIG. 9.

The switch block 27 is previously assembled and fabricated as follows. With reference to FIG. 10, a dome-shaped movable contact 12 and an intermediate plate 14 are successively placed on a switch base plate 10. Then, a fixed base plate 6 is placed on the switch base plate 10. During this step, downwardly-extending pins 6A of the fixed base plate 6 are inserted into stepped holes 10A in the switch base plate 10. Lower portions of the downwardly-extending pins 6A of the fixed base plate 6 are pressed and deformed into engagement with walls of the switch base plate 10 which define steps in the holes 10A. Thereby, the dome-shaped movable contact 12, the intermediate plate 14, the switch base plate 10, and the fixed base plate 6 are combined into the switch block 27.

A switch block 27 is made before the assembly of the composite device of FIGS. 5–8. During the assembly of the composite device of FIGS. 5–8, a binding member 15 is used as a reference and other components are moved with respect to the binding member 15 in only one direction, that is, an upward direction. Therefore, the assembly of the composite device of FIGS. 5–8 can be efficiently and easily implemented.

It is preferable that the number of the off-center pins 23D of operation shaft 23 and the number of the off-center recesses in the cylindrical portion 24B of the rotary member 24 are equal to two. Alternatively, the number of the off-center pins 23D and the number of the off-center recesses 24D may be equal to three or more.

What is claimed is:

1. A rotatively-operated component with a push switch, comprising:

a bushing which has a hole being of a circular cross section and extending through walls of the bushing, wherein the hole in the bushing has an upper portion forming a small-diameter portion and a lower portion forming a large-diameter portion;

an operation shaft extending through the hole in the bushing, the operation shaft having an upper portion forming a small diameter portion and a lower portion forming a large-diameter portion, the operation shaft being rotatable circumferentially relative to the bushing and being movable axially relative to the bushing, wherein the small-diameter portion of the operation shaft extends upward from the small-diameter portion of the hole in the bushing, and the large-diameter portion of the operation shaft is greater in diameter than the small-diameter portion of the hole in the bushing;

a rotary component portion including a rotatable member having recesses which receive downwardly extending pins on said operation shaft which are symmetrical with respect to the center of the operation shaft, and allowing the rotatable member to rotate together with the operation shaft and to be stationary independent of axial movement of the operation shaft; a fixed base plate; a first contact fixed to a lower surface of the rotatable member; and a second contact being resilient and being provided on the fixed base plate, the second contact being located below the first contact and being in touch with the first contact, the second contact sliding on the first contact as the rotatable member rotates; and a push switch portion located below the rotary component portion and engaging a lower end of the operation shaft, the push switch portion operating when being pressed by the lower end of the operation shaft in accordance with axial movement of the operation shaft.

2. A rotatively-operated component with a push switch as recited in claim 1, wherein the bushing has a step at a boundary between the small-diameter portion and the large diameter portion of the hole in the bushing, and the operation shaft has a step at a boundary between the small-diameter portion and the large-diameter portion thereof, and wherein the step of the bushing and the step of the operation shaft are in contact with each other when the operation shaft is not pressing the push switch portion.

3. A method of manufacturing a rotatively-operated component with a push switch, comprising the steps of:

previously combining parts of a push switch portion and a fixed base plate of a rotary component portion into a switch block;

using an inverted U-shaped binding member as a reference while sequentially stacking a bushing, an operation shaft, a rotatable member, and the switch block from below with respect to the inverted U-shaped binding member; and bending edges of legs of the inverted U-shaped binding member into engagement with a lower surface of the switch block to combine the bushing, the operation shaft, the rotatable member, and the switch block together.

4. A composite device comprising:

a common shaft being rotatable circumferentially and being movable axially;

a rotatively-operated component including a rotary member having a contact thereon and being operated in response to rotation of the rotary member which engages said contact with a fixed contact;

a key coupling for connecting the rotary member in the rotatively-operated component with the common shaft, and allowing the rotary member to rotate in response to rotation of the common shaft and to be stationary independent of axial movement of the common shaft;

a push switch including an axially movable member and being operated in response to axial movement of the axially movable member, and means for connecting the axially movable member with the common shaft and allowing the axially movable member to move axially in response to axial movement of the common shaft;

wherein the key coupling includes an axially-extending pin provided on one of the common shaft and the rotary member in the rotatively-operated component, the axially-extending pin fitting into a recess in the other of the common shaft and the rotary member, the axially-extending pin being at a position separate from a center of rotation of the common shaft.

* * * * *